United States Patent
Klare

(10) Patent No.: US 6,676,993 B2
(45) Date of Patent: *Jan. 13, 2004

(54) POROUS MEMBRANE STRUCTURE AND METHOD

(75) Inventor: Robert John Klare, Oxford, PA (US)

(73) Assignee: BHA Technologies, Inc., Kansas, MO (US)

( * ) Notice: Subject to any disclaimer, the term of this patent is extended or adjusted under 35 U.S.C. 154(b) by 349 days.

This patent is subject to a terminal disclaimer.

(21) Appl. No.: 09/773,315

(22) Filed: Jan. 31, 2001

(65) Prior Publication Data

US 2001/0018096 A1 Aug. 30, 2001

Related U.S. Application Data

(60) Continuation-in-part of application No. 09/458,301, filed on Dec. 10, 1999, now Pat. No. 6,410,084, which is a division of application No. 09/249,519, filed on Feb. 12, 1999, now Pat. No. 6,228,447.

(51) Int. Cl.$^7$ .............................. B05D 5/00; B01D 71/26
(52) U.S. Cl. ...................... 427/245; 427/243; 427/244; 427/412.3; 210/500.36; 210/49; 264/48; 264/49
(58) Field of Search .................... 210/500.36, 490; 427/243, 245, 244, 246, 394, 393.4, 389.9, 412.3; 264/48, 49

(56) References Cited

U.S. PATENT DOCUMENTS

| | | |
|---|---|---|
| 4,194,041 A | 3/1980 | Gore et al. |
| 4,419,187 A | 12/1983 | Cheng et al. |
| 4,470,859 A | 9/1984 | Benezra et al. |
| 4,742,140 A | 5/1988 | Greenwood et al. |
| 5,049,275 A | 9/1991 | Gillberg-LaForce et al. |
| 5,156,780 A | 10/1992 | Kenigsberg et al. |

(List continued on next page.)

OTHER PUBLICATIONS

Material Safety Data Sheet for Zonyl 7040 Fabric Protector, Ciba Specialty Chemicals Corporation, printed Oct. 28, 1998.
Zonyl fluorochemical intermediates, Technical Information, DuPont Performance Chemicals, Oct. 1997.
"Zonyl" TA–N fluorochemical intermediate, Sales Specifications, DuPont Specialty Chemicals, 3/96.
Zonyl Catalog fluorosurfactants, fluorointermediates, fluorinated coatings additives, DuPont Performance Chemicals, 2/98.

Primary Examiner—Ana Fortuna
(74) Attorney, Agent, or Firm—Greg Strigalski; Lana M. Knedlik

(57) ABSTRACT

A method of treating a membrane comprises the steps of providing a membrane with surfaces that define a plurality of pores extending through the membrane. Providing a dispersion of oleophobic fluoropolymer solids. Stabilizing the dispersion with a stabilizing agent. Diluting the dispersion with a wetting agent. Wetting surfaces which define the pores in the membrane with the diluted and stabilized dispersion. Removing the wetting agent and the stabilizing agent from the membrane. Coalescing the oleophobic fluoropolymer solids of the dispersion on surfaces that define pores in the membrane. A composite membrane comprises a porous membrane having a plurality of interconnecting pores extending through the membrane and made from a material which tends to absorb oils and certain contaminating surfactants. A coating is disposed on surfaces of the nodes and fibrils defining the interconnecting passages in the membrane. The coating comprises oleophobic fluoropolymer solids coalesced on surfaces of the nodes and fibrils to provide oil and surfactant resistance to the composite membrane without completely blocking pores in the membrane. The composite membrane is gas permeable, liquid penetration resistant and capable of moisture vapor transmission at a rate of at least 70,000 gr/m$^2$day.

19 Claims, 3 Drawing Sheets

U.S. PATENT DOCUMENTS

| | | |
|---|---|---|
| 5,342,434 A | 8/1994 | Wu |
| 5,344,903 A | 9/1994 | Raiford et al. |
| 5,352,513 A | 10/1994 | Mrozinski et al. |
| 5,376,441 A | 12/1994 | Wu |
| 5,539,047 A | 7/1996 | Wu et al. |
| 5,539,072 A | 7/1996 | Wu |
| 5,554,414 A | 9/1996 | Moya |
| 5,690,949 A | 11/1997 | Weimer et al. |
| 5,738,111 A | 4/1998 | Weimer et al. |
| 5,976,380 A | 11/1999 | Moya |

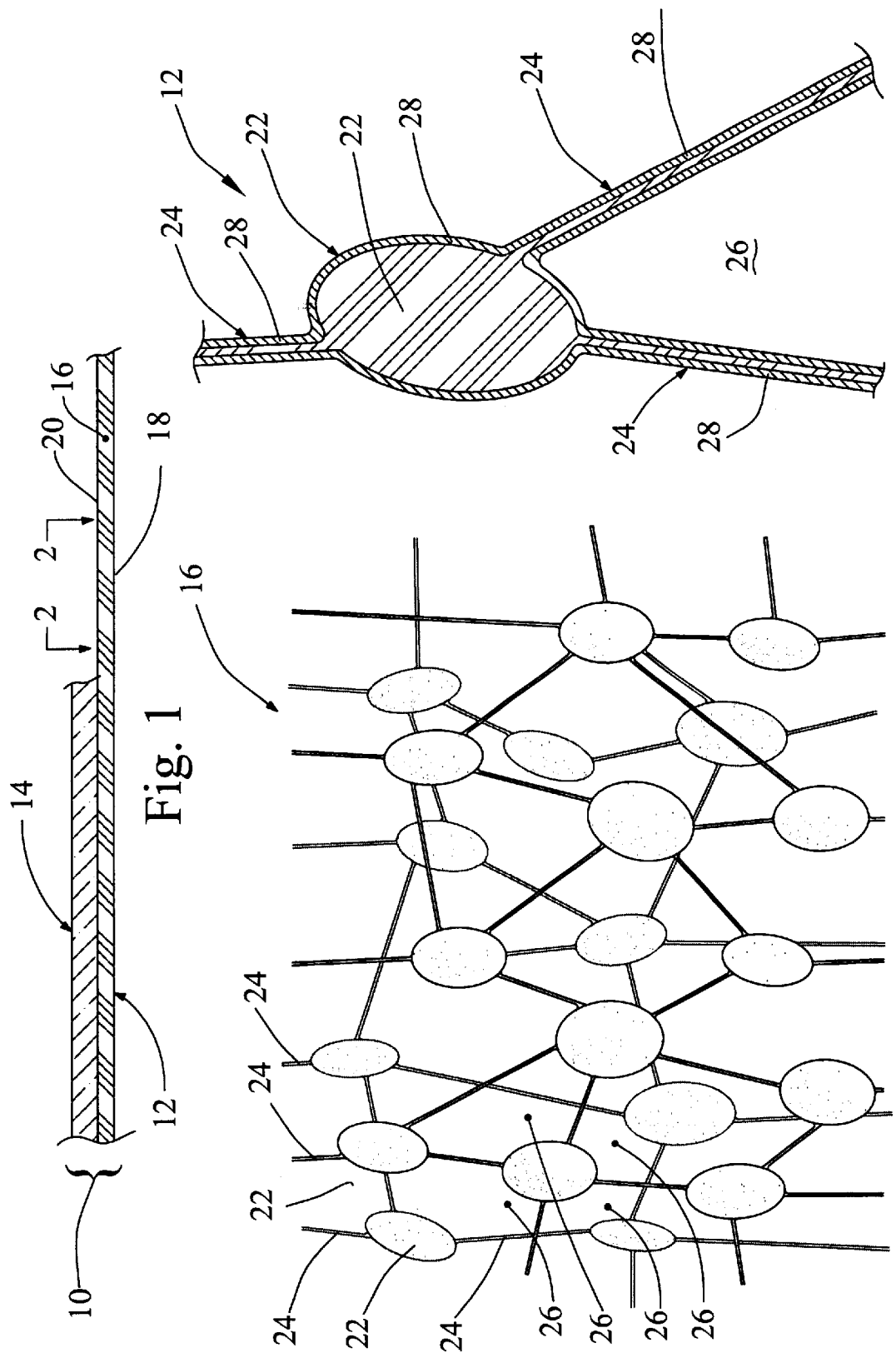

POROUS MEMBRANE STRUCTURE AND METHOD

RELATED APPLICATIONS

The present application is a continuation-in-part application of U.S. patent application Ser. No. 09/458,301 filed Dec. 10, 1999, now U.S. Pat. No. 6,480,084, which is a divisional application of U.S. patent application Ser. No. 09/249,519 filed Feb. 12, 1999, now U.S. Pat. No. 6,228,447.

BACKGROUND OF THE INVENTION

1. Technical Field

The present invention relates generally to a composite membrane and a method of making the composite membrane. In particular, the present invention relates to a porous membrane that is treated to provide oleophobic properties to the membrane and to a method of treating the membrane.

2. Description of the Prior Art

It is known that technical fabrics must be suitable for use in demanding applications. Examples of such demanding applications include filter elements, outerwear garments and apparel, footwear, tents, sleeping bags, protective garments, clean room garments, surgical drapes, surgical gowns, other types of barrier wear and allergen barrier products. The technical fabrics often include a film or membrane to protect the fabric user from an external condition or environment and/or protect the external environment from contamination by the user. The film or membrane may be made from any suitable material or structure and in any suitable manner.

A known material for the membrane that has proven particularly suitable for such demanding applications is made of an expanded polytetrafluoroethylene ("ePTFE") material. The ePTFE membrane is typically microporous and laminated to at least one other material, such as a textile base or shell fabric. The resulting membrane and fabric laminate can be used to manufacture any number of finished products to meet the demands of the particular application.

It is known that an ePTFE membrane is air permeable and moisture vapor transmissive, yet resistant to wind and liquid penetration at moderate pressures. However, the ePTFE membrane tends to absorb oils and certain contaminating agents, such as body oils contained in perspiration, fatty substances or detergent-like contaminants. When the ePTFE membrane becomes contaminated by absorbing the oils or other contaminating agents, the membrane may no longer effectively resist liquid penetration.

One known approach to rendering an ePTFE membrane resistant to contamination by absorbing oils or contaminating agents includes applying a layer of polyurethane onto, or partially into, the ePTFE membrane, as disclosed in U.S. Pat. No. 4,194,041. A membrane with a polyurethane layer is generally contaminating agent resistant and has relatively high moisture vapor transmission rates. However, air may not freely permeate through the polyurethane layer. It is known that some degree of air permeability is desirable to increase user comfort. It is also known that the polyurethane layer must be wet in order to effectively transmit moisture vapor which can feel cold, wet and "clammy" to the user.

Another known approach to contamination resistance is to coat surfaces defining the pores in a porous membrane with a fluoroacrylate monomer and a polymerization initiator, as disclosed in U.S. Pat. No. 5,156,780. The initiator is activated to polymerize the monomer in situ to coat surfaces defining the pores in the membrane. This approach provides a membrane that is somewhat air permeable and resistant to absorbing oils and contaminating agents. However, this approach requires relatively expensive equipment and materials, such as an ultraviolet curing station and a nearly oxygen-free or inert atmosphere, to process and polymerize the monomer once it is applied to the membrane. Furthermore, this approach requires solvents, cross-linking reactants and/or initiators that may be environmentally unsound and difficult to obtain.

Yet another known approach is to coat a microporous membrane with an organic polymer having recurring pendant fluorinated organic side chains, as disclosed in U.S. Pat. No. 5,539,072. An aqueous dispersion carries the polymer and cannot enter the pores of the membrane. A relatively expensive fluorosurfactant is used in amounts that may be difficult to completely remove from the membrane in order to permit the polymer in the aqueous dispersion to enter the pores of the membrane.

Thus, a need exists to provide a membrane that is air permeable, moisture vapor transmissive, wind and liquid penetration resistant, durably resists absorbing oils and certain contaminating agents, is relatively inexpensive and easy to manufacture, made from readily available materials and does not require relatively expensive equipment, processes or materials. There is also a need to limit the agglomeration and "settling" of dispersed particles or "solids" in a coating that is to be applied to the membrane for a predetermined duration.

SUMMARY OF THE INVENTION

The present invention is directed to a method of treating a membrane. The method comprises the step of providing a membrane with surfaces that define a plurality of pores extending through the membrane. A dispersion of oleophobic fluoropolymer solids is provided. The dispersion is stabilized with a stabilizing agent. The dispersion is diluted with a wetting agent. Surfaces which define the pores in the membrane are wetted with the diluted and stabilized dispersion. The wetting and stabilizing agents are removed from the membrane. The oleophobic fluoropolymer solids of the dispersion are coalesced on surfaces that define pores in the membrane.

The step of providing a membrane comprises providing a microporous membrane, such as a membrane made from expanded polytetrafluoroethylene. The diluting step comprises diluting the stabilized dispersion in a wetting agent so the diluted and stabilized dispersion has a surface tension and contact angle relative to the membrane such that the diluted and stabilized dispersion is capable of wetting surfaces defining the pores in the membrane. The step of stabilizing the dispersion comprises providing the stabilizing agent in a weight amount in the range of 0.5 to 5 times the weight of the wetting agent. The step of stabilizing the dispersion includes providing water as the stabilizing agent.

The step of providing a dispersion of oleophobic fluoropolymer solids comprises providing a dispersion of acrylic based polymer with fluorocarbon side chains. The step of diluting the dispersion of oleophobic fluoropolymer solids with a wetting agent comprises providing the wetting agent in a weight amount in the range of 2 to 10 times the weight of the dispersion. The coalescing step comprises heating the oleophobic fluoropolymer solids to a temperature in the range of 200° C. to 240° C. for at least ten seconds to flow and coalesce the oleophobic fluoropolymer solids on surfaces defining the pores in the membrane without completely blocking the pores.

The present invention is also directed to a composite membrane. The composite membrane comprises a porous membrane having a plurality of interconnecting pores extending through the membrane and made from a material that tends to absorb oils and certain contaminating surfactants. A coating is disposed on surfaces of the nodes and fibrils defining the interconnecting passages in the membrane. The coating comprises oleophobic fluoropolymer solids coalesced on surfaces of the nodes and fibrils to provide oil and surfactant resistance to the resultant composite membrane without completely blocking pores in the membrane. The membrane is gas permeable, liquid penetration resistant and capable of moisture vapor transmission at a rate of at least 70,000 gr/m$^2$day.

The composite membrane includes the membrane being made from expanded polytetrafluoroethylene. The composite membrane is gas permeable at a rate of at least 0.10 cubic feet per minute per square foot.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic sectional view of a laminated fabric that includes a composite membrane embodying the present invention;

FIG. 2 is an enlarged schematic plan view of a portion of the membrane illustrated in FIG. 1, viewed approximately along the line 2—2 in FIG. 1;

FIG. 3 is a greatly enlarged schematic sectional view of a portion of the membrane in FIG. 2, illustrating a coating disposed on surfaces of nodes and fibrils that define pores in the membrane;

DESCRIPTION OF PREFERRED EMBODIMENTS

Figure 4:
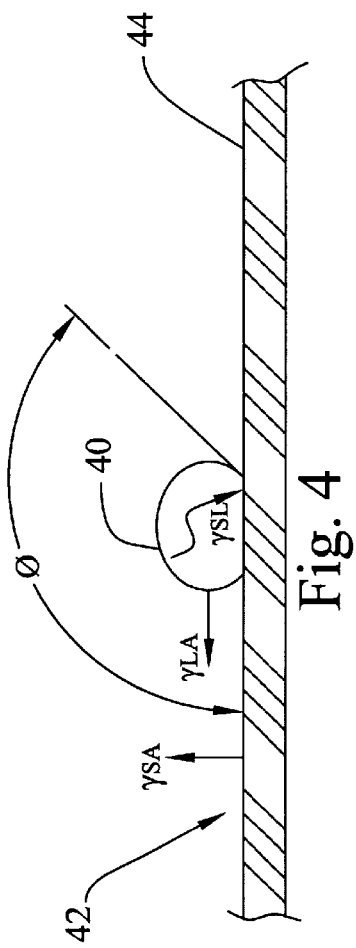
FIG. 4 is a schematic illustration of the relationship between a liquid drop and a solid.

Laminated fabric 10 (FIG. 1) incorporating a composite membrane 12, made according to the present invention, is wind and liquid penetration resistant, moisture vapor transmissive and air permeable. The laminated fabric 10 is resistant to contamination by absorbing or adsorbing oils and certain contaminating agents, such as body oils, fatty substances, detergent-like contaminants or perspiration that contains oil-based components. The laminated fabric 10 also includes a layer of textile base or shell fabric material 14 that is laminated to the composite membrane 12 by any suitable process. The shell fabric 14 may be made from any suitable material that meets performance and other criteria established for a given application in which the laminated fabric 10 will be used.

"Moisture vapor transmissive" is used to describe an article that permits the passage of water vapor through the article, such as the laminated fabric 10 or composite membrane 12. The term "resistant to liquid penetration" is used to describe an article that is not "wet" or "wet out" by a challenge liquid, such as water, and prevents the penetration of liquid through the membrane under ambient conditions of relatively low pressure. The term "resistant to wind penetration" describes the ability of an article to prevent air penetration above more than about three (3) CFM per square foot at a pressure differential across the article of 0.5" of water. The term "oleophobic" is used to describe an article that is resistant to contamination by absorbing or adsorbing oils, greases or body fluids, such as perspiration and certain other contaminating agents.

The composite membrane 12 embodying the present invention includes a membrane 16. The membrane 16 is porous, and preferably microporous, with a three-dimensional matrix or lattice type structure of numerous nodes 22 (FIG. 2) interconnected by numerous fibrils 24. The material that the membrane 16 is made from is preferably expanded polytetrafluoroethylene ("ePTFE"). Surfaces of the nodes 22 and fibrils 24 define numerous interconnecting pores 26 that extend through the membrane 16 between opposite major side surfaces 18, 20 (FIG. 1) of the membrane.

By way of example, garments or other finished products incorporating the laminated fabric 10 permit moisture vapor transmission through the garment. Moisture vapor typically results from perspiration. The garment or finished product permits moisture vapor transmission at a rate sufficient for the user to remain dry and comfortable during use in most conditions. The laminated fabric 10 is also resistant to liquid and wind penetration, while being air permeable. The membrane 16 has a tendency to become contaminated by absorbing or adsorbing certain contaminating materials such as oils, body oils in perspiration, fatty substances, detergent-like surfactants or other contaminating agents. When the membrane 16 becomes contaminated, resistance to liquid penetration may be lost.

The membrane 16 of the present invention could be coated with an oleophobic fluoropolymer material in such a way that enhanced oleophobic and hydrophobic properties result without compromising its air permeability or moisture vapor transmission rate. The membrane 16 has a coating 28 (FIG. 3), embodying the present invention, to provide increased hydrophobic and oleophobic properties. The coating 28 surrounds and adheres to the nodes 22 and fibrils 24 that define the pores 26 in the membrane 16. The coating 28 also conforms to the surfaces of most, and preferably all, the nodes 22 and fibrils 24 that define the pore 26 in the membrane 16. The coating 28 improves the oleophobicity of the membrane 16 by resisting contamination from absorbing or adsorbing materials such as oils, body oils in perspiration, fatty substances, detergent-like surfactants and other contaminating agents. The composite membrane 12 embodying the present invention has durable liquid penetration resistant when subjected to rubbing, touching, folding, flexing, abrasive contact or laundering.

Microporous membranes 16, such as those made from such as ePTFE, have a multiplicity of interconnecting voids which allow the transfer of fluids (gases or liquid vapors) from one outer major side membrane surface 18 or 20 to the opposite outer membrane major side surface 20 or 18. The membrane 16 may or may not resist the transfer of a given liquid depending on the free energy properties of the given liquid and membrane surfaces. The surface energy of many microporous membranes, including ePTFE, is such that the membrane resists penetration by relatively high surface tension liquids, such as water-based materials. Unfortunately, many undesirable liquids such as body oils have relatively low surface tensions, and have a tendency to be absorbed or adsorbed into the material of the membrane, even those made of ePTFE. Because water based materials normally have a relatively high surface tension, it is very difficult to coat the surfaces of the fibers and nodes within the membrane with water-based materials to make them resistant to the absorption or adsorption of fluids like body oils.

The present invention provides a process where water-based dispersions are modified so they can enter the pores of a microporous membrane such as ePTFE. The surface tension of the water-based dispersion can be reduced to where the water-based dispersion is drawn into the pores 26 of the membrane 16 by capillary action displacing the air occupying these pores and coating all the fibers and nodes within the membrane 16. The resultant composite membrane 12 will then resist the absorption or adsorption of fluids like body oils but still allow the transfer of air and moisture in the form of vapor.

The concept of a liquid drop 40 (FIG. 4) wetting a solid material 42 is also fundamental to understanding the present invention. The physical and thermodynamic definition of "wetting" is based on the concepts of surface energy and surface tension. Liquid molecules are attracted to one another at their surfaces. This attraction tends to pull the liquid molecules together. Relatively high values of surface tension mean that the molecules have a strong attraction to one another and it is relatively more difficult to separate the molecules. The attraction varies depending on the type of molecule. For example, water has a relatively high surface tension value because the attraction in water molecules is relatively high due to hydrogen bonding. Fluorinated polymers or fluoropolymers have a relatively low surface tension value because the strong electronegativity of the fluorine atom.

A contact angle Ø is defined as the angle between the liquid drop 40 and a surface 44 of the solid 42 taken at the tangent edge of where the liquid drop contacts the solid surface. The contact angle is 180° when a liquid forms a spherical drop on the solid surface. The contact angle is 0° when the drop spreads to a thin film over the solid surface.

The free energy between a solid and a liquid is inversely related to the molecular attraction between the solid and the liquid. The free energy of the solid relative to a liquid is often referred to as the surface energy $\gamma_{SL}$ of the solid relative to the liquid. The free energy of liquid relative to air is normally called the surface tension of the liquid $\gamma_{LA}$. The free energy of the solid relative to air is normally referred to as the surface energy of the solid $\gamma_{SA}$. The Young-Dupre equation relates all the free energies to the contact angle as Ø:

$$\gamma_{SA}-\gamma_{SL}=\gamma_{LA}*\text{Cos}(\emptyset) \quad \text{(Eq. 1)}$$

The degree to which a challenge liquid may "wet" a challenged solid depends on the contact angle Ø. At a contact angle Ø of 0°, the liquid wets the solid so completely that a thin liquid film is formed on the solid. When the contact angle Ø is between 0° and 90° the liquid wets the solid and there is a degree of adhesion between the liquid and the solid. When the contact angle Ø is more than 90° the liquid does not wet the solid.

For example, consider two different liquids on a polytetrafluoroethylene ("PTFE") solid surface that has a surface energy $\gamma_{SA}$ of 19 dynes/cm. One liquid, such as isopropyl alcohol ("IPA") has a surface tension $\gamma_{LA}$ of 22 dynes/cm (which is a higher value than the surface energy $\gamma_{SA}$ value of the PTFE material and one might think cannot wet the PTFE material) and a relative contact angle Ø of about 43° relative to PTFE. Therefore, IPA "wets" PTFE very well. The $\gamma_{SL}$ of IPA relative to PTFE can now be calculated by rearranging Eq. 1 to:

$$\gamma_{SL}=\gamma_{SA}-\gamma_{LA}*\text{Cos}(\emptyset)$$

$$\gamma_{SL}=19-22*\text{Cos}(43°)=3 \text{ dynes/cm}$$

In contrast, another liquid, such as deionized water has a surface tension of about 72.1 dynes/cm at 77° F. and a contact angle Ø of 112° relative to PTFE and, therefore, does not wet PTFE or is "held out." The calculated value for the surface energy $\gamma_{SL}$ of water relative to PTFE, is 46 dynes/cm.

Another aspect of contact angle Ø is important. If the contact angle Ø that a given liquid makes relative to a solid is less than 90°, the liquid can be drawn into capillaries existing in even an apparently solid material. The amount of capillary force drawing the liquid into the capillary will depend on the size of the capillary. A relatively smaller capillary exerts a relatively greater force on the liquid to draw the liquid into the capillary. If the contact angle Ø is greater than 90°, there will be a force to drive the liquid out of the capillaries. The capillary force relates to the surface energy $\gamma_{SA}$ of the solid material and to the surface tension $\gamma_{LA}$ of the liquid. The capillary force drawing the liquid into the capillaries increases with the increasing surface energy $\gamma_{SA}$ of the solid. The capillary force drawing the liquid into the capillaries also increases with decreasing surface tension $\gamma_{LA}$ of the liquid.

Likewise, if the contact angle Ø that a given liquid makes with a solid is greater than 90°, the liquid will be repelled out of the capillaries existing in even an apparently solid material. The amount of capillary force drawing the liquid into the capillary will depend on the size of the capillary. A relatively smaller capillary exerts a relatively greater force to expel the liquid from the capillary. The capillary force also relates to the surface energy $\gamma_{SA}$ of the solid material and to the surface tension $\gamma_{LA}$ of the liquid. The capillary force expelling the liquid from the capillaries increases with the decreasing surface energy $\gamma_{SA}$ of the solid. The capillary force expelling the liquid from the capillaries also increases with increasing surface tension $\gamma_{LA}$ off the liquid.

The membrane 16 made from ePTFE contains many small interconnected capillary-like pores 26 (FIG. 2) that fluidly communicate with environments adjacent to the opposite major sides 18, 20 of the membrane. Therefore, the propensity of the ePTFE material of the membrane 16 to absorb or adsorb a challenge liquid, as well as whether or not a challenge liquid would enter into the pores 26, is a function of the surface energy $\gamma_{SA}$ of the solid, the surface tension $\gamma_{LA}$ of the challenge liquid, the relative contact angle Ø between the liquid and solid and the size or flow area of the capillary-like pores.

As described above, the present invention is concerned primarily with a microporous ePTFE membrane 16. However, the present invention could equally apply to any porous membrane made from a material that tends to be oleophilic. Such membranes, when laminated to various shell fabrics, possess desirable liquid penetration resistant properties. Unfortunately, the ePTFE membrane 16 is susceptible to contamination by oils and certain contaminating agents, such as body oils, fatty substances, detergent-like contaminants or perspiration that contains oil-based components. When the membrane 16 becomes contaminated, the resistance to liquid penetration may be reduced or lost.

Certain polymeric oleophobic coatings can impart a relatively low surface energy $\gamma_{SA}$ to an ePTFE membrane so the relative contact angle Ø of most challenge liquids, oils and contaminating agents is greater than 90° so they do not wet the membrane 16. There are several such polymeric oleophobic coatings that appear to be suitable. One example of a suitable polymeric oleophobic coating is an oleophobic fluoropolymer with acrylic-based polymer containing fluorocarbon side chains and is marketed under the Zonyl® (a du Pont trademark) name.

Most of the oleophobic resins are made by emulsion and dispersion polymerization and are sold as aqueous or water-based dispersions and include some surfactant to help suspend the solids in the dispersion. The oleophobic resins are typically used to treat fabrics as durable water repellency (DWR) treatments for carpets as a dirt and stain resistant treatment. These treatments are used on fabric yarns, threads, filaments and fibers that are significantly larger in size than the nodes 22 and fibrils 24 of the membrane 16. These fabric yarns, threads, filaments and fibers normally have relatively high surface energies and are easily wet by water-based dispersions of oleophobic polymer treatments or known DWR treatments. These yarns, threads, filaments and fibers also define significantly larger voids even in a tightly knit or woven fabric than the pores 26 in the membrane 16 so there is generally no problem with coating all surfaces with the water-based dispersions of oleophobic fluoropolymer treatments or known DWR treatments.

The contact angle Ø that these water-based dispersions of oleophobic fluoropolymer treatments or known DWR treatments make with certain microporous membranes, such as the ePTFE membrane 16 (and the surface tension $\gamma_{LA}$ of these water-based dispersions of oleophobic fluoropolymer treatments or known DWR treatments relative to the ePTFE membrane) is such that the dispersions cannot wet the ePTFE membrane enough to be drawn into the pores 26 of the membrane. Consequently, the particles or polymeric solids that are intended to coat the surfaces defining the pores 26 in the membrane 16 do not contact those surfaces and may even completely block the pores of the membrane so the membrane is no longer air permeable. With many microporous membranes only one major side surface 18 or 20 of the membrane 16 can be coated using water-based dispersions of the known DWR treatments. The surfaces of the nodes 22 and fibrils 24 defining the pores 26 in the membrane 16 are not coated and, thus, cannot provide the desired oleophobic properties to the entire membrane.

In this case, there is no capillary repelling action from the pores 26 within the membrane 16. Consequently, a contaminating material physically forced through the oleophobic coating and into the pores 26 of the membrane 16 will significantly reduce the resistance to liquid penetration of the membrane. In fact, if both surfaces 18, 20 of the membrane 16 are coated but the surfaces of the pores 26 are not, it is possible for a contaminating material to be physically forced through the oleophobic coating and into pores where it will be locked into these pores. This is because the oleophobic coating would create a capillary-barrier force for the contaminating material to overcome to get out of the inside pores 26. In contrast, if all the surfaces of the pores 26 are coated, as is possible with this invention, and a contaminate is forced into the pores, there would be a capillary force tending to force the contaminate out of these pores. It is also likely that any relatively small amount of coating that was able to attach to a major side surface 18 or 20 of the membrane 16 is not very durable and can be removed during use or laundering.

Substantially improved oleophobic properties of the microporous membrane 16 can be realized if the surfaces defining the pores 26 in the membrane and the major side surfaces 18, 20 of the membrane are coated with a water-based dispersion of an oleophobic fluoropolymer. The limiting factor has been the lack of an effective way to introduce the water-based dispersion of the oleophobic fluoropolymer into the pores 26 of the membrane 16 to coat the surfaces of the nodes 22 and fibrils 24 that define the pores. The present invention provides a way to introduce the water-based dispersion of the oleophobic fluoropolymer into the pores 26 of the membrane 16 to coat the surfaces of the nodes 22 and fibrils 24 that define the pores without completely blocking the pores.

It has been found that the water-based dispersion of oleophobic resin or solids is capable of wetting the membrane 16 and entering pores 26 in a microporous membrane 16 when diluted by sufficient amount of a water-miscible wetting agent, for example IPA. The diluted dispersion of oleophobic fluoropolymer has a surface tension $\gamma_{LA}$ and relative contact angle Ø that permit the diluted dispersion to wet and be drawn into the pores 26 of the membrane 16. The minimum amount of wetting agent that is required for the blend to enter the pores 26 in the membrane 16 depends on the surface tension $\gamma_{LA}$ of the diluted dispersion required to obtain the required relative contact angle Ø between the diluted dispersion and the material of the microporous membrane 16 for drawing the dispersion into the pores of the membrane and to displace the air residing in the pores. This minimum amount of wetting agent can be determined experimentally by adding drops of different blend ratios to the surface of the microporous membrane 16 and observing which concentrations are immediately drawn into the pores 26 of the membrane.

It has been found that liquid organic wetting agents tend to destabilize the dispersions either by affecting the action of the surfactant or the dispersion particles, such as by softening the dispersion particles. The dispersion particles or solids then have a tendency to attach to one another or "agglomerate". This agglomeration yields a relatively large solid that may be too large to enter a pore 26 in the membrane 16. Further, the agglomerated solids tend to "settle" out of the dispersion making it difficult to apply them to the membrane 16. The present invention provides a way to delay the removal of surfactant and the resultant agglomeration.

Liquid penetration resistance of a microporous membrane 16 may be lost if a challenge fluid or liquid can "wet" the membrane. The normally hydrophobic microporous membrane 16 loses its liquid penetration resistance when the liquid initially contacts and wets a major side surface 18 or 20 of the membrane and subsequently contacts and wets the surfaces defining the pores 26 in the membrane. Progressive wetting of the surfaces defining the interconnecting pores 26 occurs until the opposite major side surface 20 or 18 of the microporous membrane 12 is reached by the wetting or "challenge" liquid. If the challenge liquid cannot wet the microporous membrane 16, liquid repellency is retained.

To prevent or minimize the loss of resistance to liquid penetration in an ePTFE membrane, the value of the surface energy $\gamma_{SA}$ of the membrane must be lower than the value of the surface tension $\gamma_{LA}$ of the challenge liquid and the relative contact angle Ø must be more than 90°. Surface energy $\gamma_{SA}$ and surface tension $\gamma_{LA}$ values are typically given in units of dynes/cm. Examples of surface energies $\gamma_{SA}$, surface tensions $\gamma_{LA}$ and some measured contact angles Ø are listed in the table below:

| Material | Surface Energy | Surface Tension | Contact Angle |
| --- | --- | --- | --- |
| PTFE | 19 dynes/cm | | |
| tap water | | 77.5 dynes/cm | 114° |
| deionized water | | 72 dynes/cm | 112° |
| blood | | 60 dynes/cm | |
| perspiration | | 42 dynes/cm | |
| hexane | | 20.4 dynes/cm | |
| 25% Zonyl ® 7040 in IPA | | 25.3 dynes/cm | 50° |
| Zonyl ® 7040 polymer solids | | 4 dynes/cm | |
| Zonyl ® 7040, as purchased | | 35.9 dynes/cm | 79° |
| Laundry detergent mix | | 30.9 dynes/cm | |
| Acetone | | 25.4 dynes/cm | 37° |
| 30 wt-% IPA | | 29.0 dynes/cm | |
| 40 wt-% IPA | | 27.7 dynes/cm | |
| 50 wt-% IPA | | 26.8 dynes/cm | |
| 60 wt-% IPA | | 26.5 dynes/cm | |
| 70 wt-% IPA | | 25.8 dynes/cm | 43° |
| 80 wt-% IPA | | 25.0 dynes/cm | |
| 90 wt-% IPA | | 24.5 dynes/cm | |
| 100 wt-% IPA | | 23.5 dynes/cm | 24° |

The more that the surface tension $\gamma_{LA}$ of the challenge liquid is above the surface energy $\gamma_{SA}$ of the challenged material and/or the more the relative contact angle Ø is above 90°, the less likely the challenge liquid will wet the challenged material.

The use of a coalesced oleophobic fluoropolymer solids from a suitable material, such as the water-based dispersion of Zonyl® 7040, to form the coating 28 on the microporous membrane 16 reduces the surface energy $\gamma_{SA}$ of the composite membrane 12 so fewer challenge liquids are capable of wetting the composite membrane and enter the pores 26. The coalesced oleophobic fluoropolymer coating 28 of the composite membrane 12 also increases the contact angle Ø for a challenge liquid relative to the composite membrane. The oleophobic fluoropolymer solids from the water-based dispersion of Zonyl® 7040 include an acrylic-based polymer with fluorocarbon side chains. The side chains have been found to have one of the lowest known surface tensions $\gamma_{LA}$ so it is desirable to have these extend away from the membrane 16. The oleophobic fluoropolymer solids used to coat the membrane 16 is preferably in the form of a stabilized water-miscible dispersion of perfluoroalkyl acrylic copolymer. The oleophobic fluoropolymer solids are dispersed primarily in water, but may also contain relatively small amounts of acetone and ethylene glycol or other water-miscible solvents and surfactants that were used in the polymerization reaction when the fluoropolymer solids were made.

The coating 28 is disposed on and around surfaces of the nodes 22 and fibrils 24 that define the interconnecting pores 26 extending through the membrane 16. The coating 28 enhances the hydrophobic properties of the membrane 16 in addition to providing better oleophobic properties to the membrane. It is contemplated that the coating 28 may be used to treat the membrane 16 only. However, the coating 28 may also be used to treat only the shell fabric 14 as durable water repellency (DWR) treatment in a separate process or at the same time the membrane 16 is treated if the shell fabric is laminated to the membrane.

The composite membrane 12 of the present invention has a relatively high moisture vapor transmission rate ("MVTR") and air permeability. The composite membrane 12 has an MVTR, measured by a modified desiccant method, of at least 70,000 g/m²/24 hrs. The composite membrane 12 has an air permeability of at least 0.1 CFM per square foot.

The composite membrane 12 is air permeable to a sufficient degree and has a sufficiently high MVTR that a user of the composite membrane can be relatively comfortable in most conditions and even during periods of physical activity in wet conditions. Once a predetermined amount of oleophobic fluoropolymer solids was properly coalesced on the membrane 16, it was found that the pores 26 in the composite membrane 12 were not dramatically reduced in flow area from that of an uncoated membrane so air permeability and MVTR were significantly great to provide good comfort to a user of the composite membrane in articles such as jackets and pants.

The membrane 16 is made by extruding a mixture of PTFE (available from du Pont under the name TEFLON®) fine particle resin and lubricant. The extrudate is then calendered. The calendered extrudate is then "expanded" or stretched in machine and transverse directions to form fibrils 24 (FIG. 2) connecting the particles or nodes 22 in a three dimensional matrix or lattice type of structure, as illustrated in FIG. 2. Surfaces of the nodes 22 and fibrils 24 define the plurality of interconnected pores 26 that are in fluid communication with one another and extend through the membrane 16 between opposite major sides 18, 20 of the membrane. A suitable size for the pores in the membrane 16 may be in the range of about 0.2 to 10 microns, and is preferably in the range of about 1.0 to 5.0 microns. "Expanded" means sufficiently stretched beyond the elastic limit of the material to introduce permanent set or elongation to the fibrils 24. The membrane 16 may be fully sintered, partially sintered or unsintered. "Sintering" means changing the state of the PTFE material from crystalline to amorphous.

Other materials and methods can be used to form a suitable microporous (defined here as having an average pore size of about 10 microns or less) membrane that has pores extending through the membrane. For example, other suitable materials that may be used to form a microporous membrane include polyolefin, polyamide, polyester, polysulfone, polyether, acrylic and methacrylic polymers, polystyrene, polyurethane, polypropylene, polyethylene, cellulosic polymer and combinations thereof.

After the ePTFE membrane 16 is manufactured, a stabilized and diluted dispersion of the oleophobic fluoropolymer solids is applied to the membrane to wet the surfaces of the nodes 22 and fibrils 24 that define the pores 26 in the membrane. The thickness of the coating 28 and the amount and type of fluoropolymer solids in the coating may depend on several factors. These factors include the affinity of the solids to adhere and conform to the surfaces of the nodes 22 and fibrils 24 that define the pores 26 in the membrane or whether abuse of the membrane during use and laundering may crack, dislodge, damage or disrupt the coating. After the wetting operation, substantially all of the surfaces of the nodes 22 and fibrils 24 are at least partially wetted, and preferably all the surfaces of all the nodes and fibrils are completely wetted and the pores 26 in the membrane 16 are not blocked.

It is not necessary that the coating 28 completely encapsulate the entire surface of a node 22 or fibril 24 or be continuous to increase oleophobicity of the membrane 16, but it is preferred. The finished coating 28 results from coalescing the oleophobic fluoropolymer solids on as many of the surfaces of the nodes 22 and fibrils 24 defining the pores 26 in the membrane 16 as possible. The preferred dispersion has a surface tension $\gamma_{LA}$ that is greater than the surface energy $\gamma_{SA}$ of the membrane 16 and/or a relative contact angle Ø that does not permit the aqueous dispersion, as received, to wet the pores 26 in the membrane. The water-based dispersion is "stabilized" with a stabilizing agent, such as deionized and demineralized water, in order to delay the onset of agglomeration and settling of the oleophobic fluoropolymer solids. The stabilized dispersion is diluted in a water-miscible wetting agent, such as IPA. The diluted and stabilized dispersion has a surface tension $\gamma_{LA}$ and/or a relative contact angle Ø that permits the diluted and stabilized dispersion to enter the pores 26 in the membrane 16 and wet the surfaces of the pores.

The oleophobic fluoropolymer solids of the diluted and stabilized dispersion engage and adhere to surfaces of the nodes 22 and fibrils 24 that define the pores 26 in the membrane 16 after the stabilizing and wetting agent materials are removed. The oleophobic fluoropolymer solids are heated on the membrane 16 to flow and coalesce. The composite membrane 12 is, thus, rendered resistant to contamination by absorbing or adsorbing oils and contaminating agents. During the application of heat, the thermal mobility of the oleophobic fluoropolymer solids allows the solids to be mobile and flow around the nodes 22 and fibrils 24 and coalesce to form a relatively thin and even coating 28. At the relatively elevated temperature, the mobility of the oleophobic fluoropolymer solids also permits the fluorocarbon side chains to orient themselves to extend in a direction away from the nodes 22 and fibrils 24. The coalesced oleophobic fluoropolymer provides a relatively thin protective coating 28 on the membrane 16 that does not completely block or "blind" the pores 26 in the composite membrane 12 which could adversely affect moisture vapor transmission or air permeability through the composite membrane.

The preferred dispersion of oleophobic fluoropolymer solids includes an acrylic-based polymer with fluorocarbon side chains and a relatively small amount of water, water soluble co-solvent and glycol. There could be other solvents, co-solvents or surfactants in the aqueous dispersion without detracting from the spirit and scope of the present invention. One family of oleophobic fluoropolymer solids that has shown particular suitability is the Zonyl® family of fluorine containing polymers (made by du Pont and available from CIBA Specialty Chemicals). A particularly suitable dispersion in the Zonyl® family is Zonyl® 7040. Other commercially available chemicals that are suitable are TLF-8868, TLF-9312, TLF-9373, TLF-9404A and TLF-9494B all available from DuPont. These chemicals are typical examples of durable water repellency ("DWR") treatments typically used for textiles, fibers and fabrics but not microporous membranes.

The dispersion of acrylic-based polymer with fluorocarbon side chains is stabilized with a stabilizing agent. A preferred stabilizing agent has been found to be deionized and demineralized water. The stabilizing agent reduces the propensity of the oleophobic fluoropolymer solids from settling out and agglomerizing to a size which cannot enter a pore in the membrane 16. The stabilized dispersion of acrylic-based polymer with fluorocarbon side chains is then diluted in a suitable wetting agent, such as ethanol, isopropyl alcohol, methanol, n-propanol, n-butanol, N-N-dimethylformamide, methyl ethyl ketone and water soluble e- and p- series glycol ethers.

A particularly suitable amount of oleophobic fluoropolymer solids in the Zonyl® 7040 diluted and stabilized dispersion is in the range of about 5 wt-% to 25 wt-%, and preferably 10 wt-% to 20 wt-%. The amount of IPA present is in the range of about 30 wt-% to 90 wt-%, and preferably 60 wt-% to 90 wt-%. The amount of stabilizing agent in the form of deionized and demineralized water is in the range of about 5 wt-% to 50 wt-%, and preferably 15 wt-% to 25 wt-%. The diluted and stabilized dispersion contains oleophobic fluoropolymer solids in the range of about 1.0 wt-% to about 5.0 wt-%, and preferably 2.0 to 4.0 wt-%. The average particle size of the oleophobic fluoropolymer solids is about 0.15 micron. The resulting diluted and stabilized dispersion has surface tension $\gamma_{LA}$ and a relative contact angle Ø properties that enable the diluted and stabilized dispersion to wet pores 26 in the membrane 16 and ultimately be coated with oleophobic fluoropolymer solids. The dispersion is diluted to provide a ratio by weight of wetting agent to dispersion in the range of about 1:5 to 20:1, and preferably about 1.8:1 to 5:1. The dispersion is stabilized by providing an amount of stabilizing agent in the range of about 0.5 to 5 times the weight of the dispersion, and preferably an amount of stabilizing agent in the range of about 1 to 3 times the weight of the dispersion.

It should be apparent that the final solids content determines the amount of coating 28 that is applied to the membrane 16. The amount of coating 28 applied to the membrane 16 also depends on the coating process. The combination of stabilizing agent and wetting agent is used to dilute the "as purchased" dispersion to the desired solids content. It is desired that the ratio of stabilizing agent to wetting agent be a maximum in order to maximize the stability of the coating dispersion. However, enough wetting agent must be present to ensure proper wetting of the membrane 16 and flow of dispersion into the pores 26 in the membrane.

Method

Figure 5:
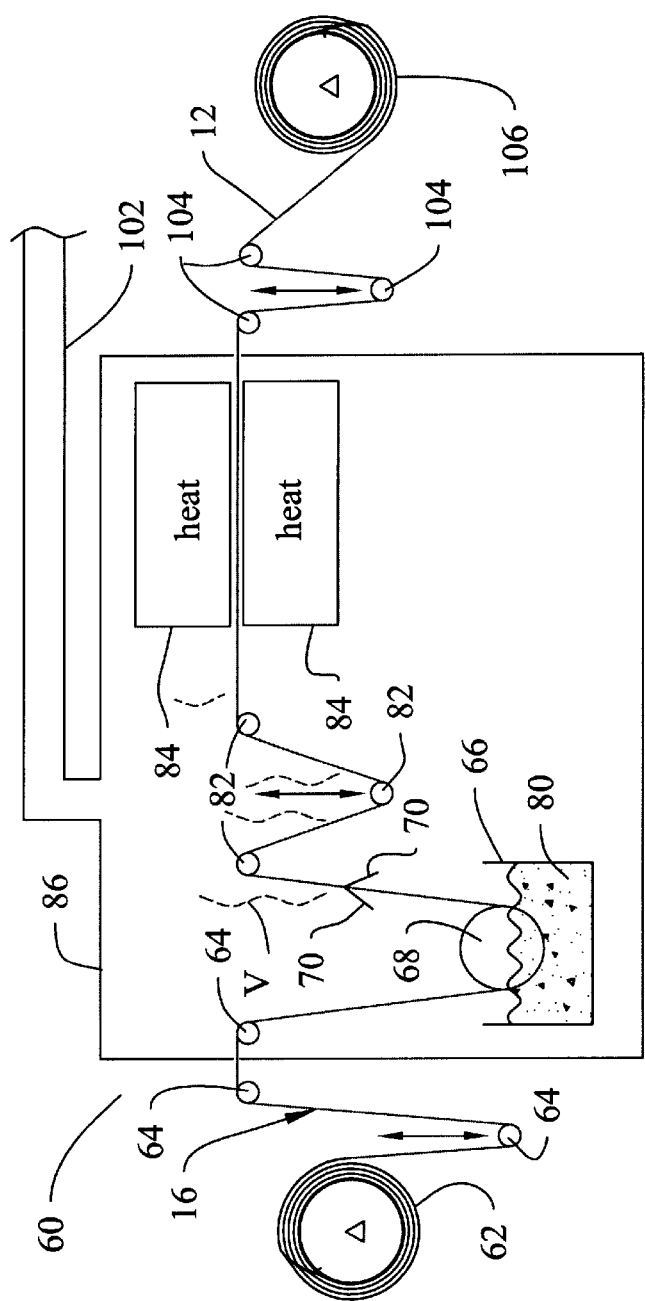
FIG. 5 is a schematic view of equipment used in the method of coating the membrane according to the present invention.

Equipment 60 for use in the method of treating the membrane 16 according to the present invention is illustrated in FIG. 5. The method includes providing the membrane 16 with surfaces defining a plurality of pores 26 extending through the membrane. Preferably, the average size of the pores 26 in the membrane 16 is microporous. The membrane 16 preferably is made from ePTFE.

The membrane 16, or alternatively the laminated fabric 10, is unreeled from a roll 62 and trained over rollers 64 and directed into a holding tank or reservoir 66 over an immersion roller 68. A diluted and stabilized dispersion 80 of oleophobic fluoropolymer solids is in the reservoir 66. The dispersion is stabilized in a suitable stabilizing agent, such as deionized and demineralized water. The dispersion is stabilized by providing an amount of stabilizing agent in the range of about 0.5 to 5 times the weight of the dispersion, and preferably an amount of stabilizing agent in the range of about 1 to 3 times the weight of the dispersion. The stabilized dispersion of oleophobic fluoropolymer solids is then diluted in a suitable wetting agent, such as isopropyl alcohol or acetone. The dispersion of oleophobic fluoropolymer solids is diluted at a ratio of wetting agent to the dispersion in the range of about 1:5 to 20:1, and preferably 1.8:1 to 5:1. The diluted and stabilized dispersion 80 can be applied to the membrane 16 by any suitable conventional method, for example, by roll-coating, immersion (dipping), spraying, or the like. The diluted and stabilized dispersion 80 impregnates the membrane 16, wets the surfaces of the nodes 22 and fibrils 24 that define the pores 26 and the surfaces that define the major sides 18, 20.

The dispersion prior to dilution has a surface tension $\gamma_{LA}$ and relative contact angle Ø so it cannot wet the pores 26 in the membrane 16. The diluted and stabilized dispersion 80 has a surface tension $\gamma_{LA}$ and relative contact angle Ø so the diluted and stabilized dispersion can wet all surfaces of the membrane 16. As the membrane 16 is immersed in the diluted and stabilized dispersion 80, surfaces of the membrane 16 that define the pores 26 are engaged, wetted and coated by the diluted and stabilized dispersion. The stabilizing agent has been shown to extend the time that the solids in the dispersion take to agglomerate or settle out from just a couple of hours to in the range of four to eight hours or more.

The wetted membrane 16 is directed out of the reservoir 66. A mechanism 70, such as a pair of squeegees or doctor blades, engages opposite major sides 18, 20 of the wetted membrane 16. The doctor blades of the mechanism 70 spread the diluted and stabilized dispersion and remove excess diluted and stabilized dispersion from the wetted membrane 16 to minimize the chance of blocking pores 26 in the membrane 16. Any other suitable means for removing the excess diluted and stabilized dispersion may be used, such as an air knife.

The wetted membrane 16 is then trained over rollers 82. The stabilizing and wetting agents and any other fugitive materials, such as the water, acetone and ethylene glycol in the preferred dispersion, is subsequently removed by air drying or other drying methods. The wetting agent typically evaporates by itself but the evaporation can be accelerated by applying relatively low heat, for example at least to about 100° C., when IPA is the wetting agent. Wetting agent vapor V the moves away from the wetted membrane 16. Removal of the stabilizing agent generally will require an affirmative step for drying, such as by the application of heat.

The wetted membrane 16 is then directed to an oven with heat sources 84. It may be necessary or desirable to enclose or vent the reservoir 66 and heat sources 84 with a hood 86. The hood 86 may be vented to a desired location through a conduit 102. The hood 86 removes and captures the vapor V, such as, fugitive wetting and stabilizing agents, from the wetted membrane 16 and directs the captured material to a location for storage or disposal. The heat sources 84 could each have two heating zones. The first zone would be a "drying zone" to apply relatively low heat to the wetted membrane 16 for example 100° C., to remove or evaporate any fugitive wetting and stabilizing agents that have not evaporated yet. The second zone would be a "curing zone" to coalesce the oleophobic fluoropolymer solids.

The heat sources 84 apply at least 200° C. heat for at least ten (10) seconds to the wetted membrane 16. Preferably, the heat sources 84 apply heat in the range of 220° C. to 240° C. for about thirty (30) seconds to the wetted membrane 16. This amount heat permits the oleophobic fluoropolymer solids to reduce their surface tension to flow and spontaneously wet and better coat the surfaces defining the nodes 22 and fibrils 24. The oleophobic fluoropolymer solids flow and coalesce around the surfaces of the nodes 22 and fibrils 24 to render the composite membrane 12 oil and contaminating agent resistant. The amount and duration that the heat is applied to the treated membrane 16 allows the oleophobic fluoropolymer solids to coalesce orient and so tails made of the fluorocarbon side chains (not shown) extend in a direction away from the surfaces of the nodes 22 and fibrils 24 that are coated. The composite membrane 12 exits the heat sources 84 and is then trained over rollers 104 and directed onto a take up reel 106.

Figure 6:
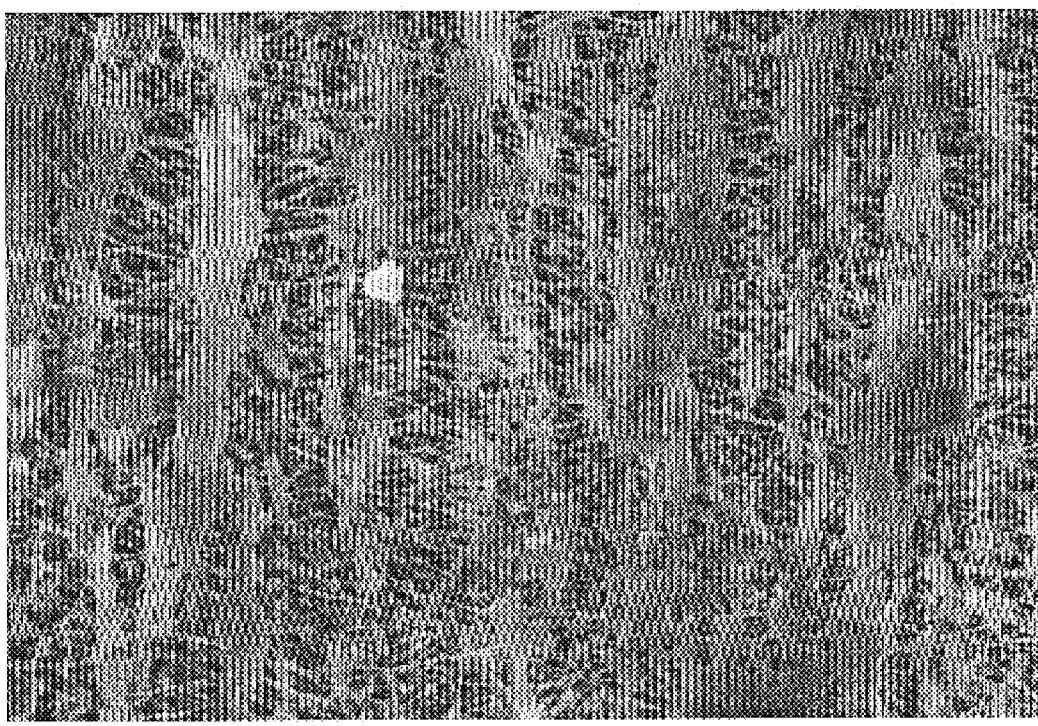
FIG. 6 is an SEM photograph of a membrane prior to the application of the coating.
Figure 7:
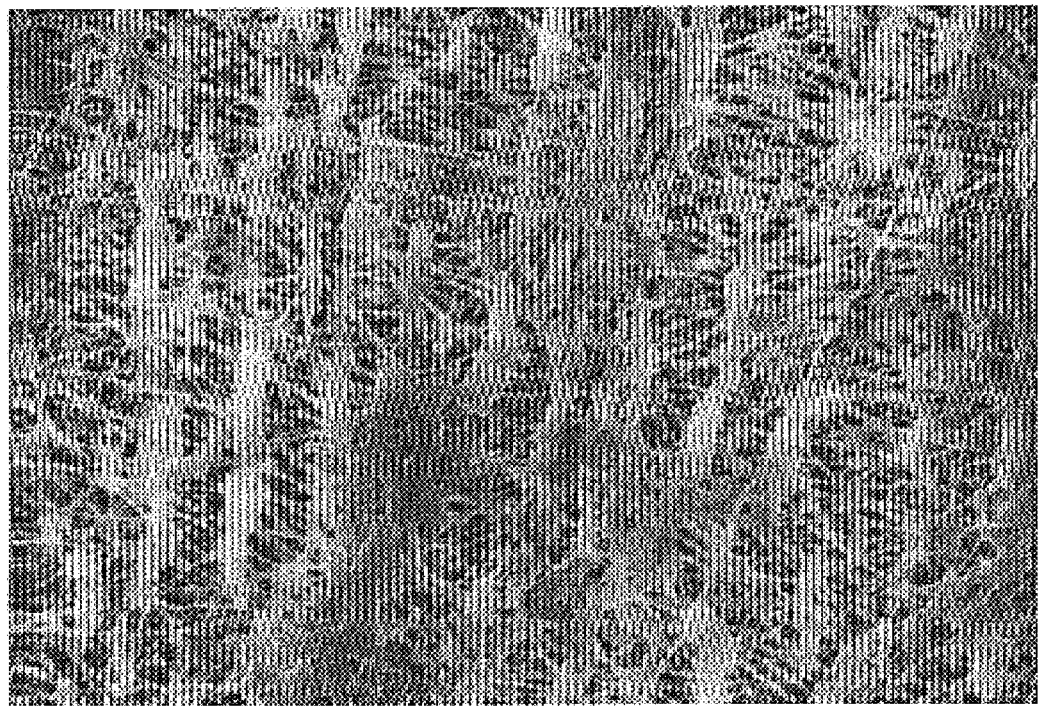
FIG. 7 is an SEM photograph of a membrane after being coated according to the present invention.

A scanning electron microscope (SEM) photograph of an uncoated membrane 16 is illustrated in FIG. 6. For comparison purposes, a composite membrane 12 embodying the present invention is illustrated in FIG. 7. The composite membrane 12 includes the same uncoated membrane 16, illustrated in FIG. 6, with the coating 28 applied. The membranes 16 (FIG. 6) and 12 (FIG. 7) are from the same production run. The SEMs are at the same magnification and it will be seen that the coated fibrils 24 have a thicker appearance due to the layer of coating 28 on the fibrils but the pores 26 in the membrane 12 are not completely blocked. It will be apparent that some pores 26 in the composite membrane 12 could be blocked, but such blockage is minimal and dependent on variables in the coating process and structure of the membrane 16.

The composite membrane 12 embodying the present invention can be used in filters, outerwear garments apparel, tents, sleeping bags, protective garments, clean room garments, surgical drapes, surgical gowns and other types of barrier wear. The composite membrane 12 may be laminated or layered with other porous materials or fabrics, such as woven cloth, non-woven fabric such as non-woven scrim, or foam material. The use of such additional materials preferably should not significantly affect the wind and liquid penetration resistance, moisture vapor transmission or air permeability of the laminated fabric 10. The coating 28 is flexible and durable so the composite membrane 12 is quiet, comfortable, wash durable and has good "hand".

It is important that the composite membrane 12 remains air permeable after the oleophobic fluoropolymer solids coalesce to form the coating 28. Depending on the material, pore size, pore volume, thickness, etc., of the porous membrane 16, some experimentation may be required to optimize the process for applying the coating 28. The experimentation can address the diluted and stabilized dispersion 80 with respect to solids concentration, wetting agent selected, stabilizing agent selected, etc., in order to obtain an oil and water repellent coating 28 that minimally influences air-permeability, yet provides the desired level of oil and water repellency. The experimentation can also involve other methods of applying the diluted and stabilized dispersion, removing the wetting and stabilizing agents and coalescing the oleophobic fluoropolymer solids.

TEST DESCRIPTIONS

Moisture Vapor Transmission Rate

Moisture vapor transmission rates (MVTR) are preferably measured by a known method termed the Dry Modified Desiccant Method (MDM). This method provides a high relative humidity in contact with the sample without direct liquid contact with the sample membrane.

In the MDM method an expanded PTFE control membrane is tightly mounted in an embroidery hoop and floated upon the surface of a controlled temperature circulating water bath. A desired amount of a desiccant is placed into a cup. Another expanded PTFE control membrane is sealed to the cup to create a tight and leak-proof microporous barrier containing the desiccant. The test apparatus is located in an environmentally controlled room and the water is maintained at a predetermined temperature.

A membrane sample to be tested is mounted tight in another embroidery hoop and placed in the center of the control membrane in first hoop. After allowing the control membrane in the first hoop to equilibrate with the water for a predetermined time, the cup assembly is weighed to the nearest $1/1,000$ gram and placed in an inverted manner on the center of the sample membrane in the second hoop.

Water transport is provided by the driving force between the water and the desiccant providing water vapor movement in a direction from the water bath to the desiccant. The sample membrane is tested for a measured time and then the cup assembly is removed and weighed again to within $1/1,000$ gram. The MVTR of the sample is calculated from the weight gain of the cup assembly and is expressed in grams of water per square meter of sample surface area per 24 hours.

Moisture vapor transmission rates (MVTR) may alternatively be measured using relatively new test equipment and procedures defined herein as "dynamic test methods for air permeable materials". One such dynamic test method is proposed ASTM Standard Test Method for Water Vapor Transmission Rates of 500 to 100,000 g/m²/day through nonwoven and plastic barriers. Another such dynamic test method is described in Natick Technical Report (Natick/TR-98/014) entitled Convection/Diffusion Test Method for Porous Materials using the Dynamic Moisture Permeation Cell.

Wetting Test

A challenge liquid, such as water, is sprayed or dropped onto the surface of a sample of test material to visually assess the wet state and the extent of infiltration of the liquid into the material. When wetted and penetrated by the test liquid, the samples generally change in appearance from opaque or semi-transparent to transparent.

Other test liquids that were used include 30, 40, 50, 60, 70, 80, 90 and 100 wt-% isopropyl alcohol (IPA) in tap water.

Oil Penetration Test

A challenge oil is dropped onto the surface of a sample of test material to visually assess the wetting of the liquid into the material. When wetted by the test oil, the samples generally change in appearance from opaque or semi-transparent to transparent. The number reported is that of the highest test oil number, having the lowest surface tension $\gamma_{LA}$ value, that did not wet the test specimen.

Test oils with numbers 1–8, as described in the AATCC Technical Manual were used.

Laundering Test

Test samples were placed in a test washing machine per AATCC 135 normal cotton cycle. The test samples are then removed from the washing machine, thoroughly rinsed with water to remove the detergent solution, and air-dried.

After drying, the test piece is tested for wetting by application of drops of isopropyl alcohol (IPA) to the surfaces of the test piece representative of both the inner and outer surfaces of the folded piece. The visual observations of the wetting test are reported below.

Air Permeability Test

Air permeability is measured by a Frazier Air Permeability Tester per ASTM D737 or on a Textest FX 3300 Air Permeability Tester.

Without intending to limit the scope of the invention, the following examples demonstrate how the present invention may be practiced. Test results are provided below to demonstrate the experiments performed and the methodology used to direct the present invention.

MEMBRANE EXAMPLE 1

A microporous membrane 16 (manufactured by BHA Technologies, Inc. and designated QM011) made from ePTFE material was used. The membrane 16 preferably has an average pore size in the range of about 0.35 to 1.0 micron. The membrane 16 is preferably about 0.0015 inch thick. The membrane 16 is preferably at least partially sintered.

TREATMENT EXAMPLE 1

The membrane 16 described above was treated with a diluted and stabilized Zonyl® 7040 dispersion. The following diluted and stabilized dispersion was used for treatment:

| treatment component | percent by weight |
|---|---|
| oleophobic fluoropolymer dispersion (Zonyl® 7040) | 13.9 |
| stabilizing agent (water) | 21.5 |
| wetting or diluting agent (IPA) | 64.6 |

The samples were heated to between 220° C. and 240° C. for thirty seconds to coalesce the solids onto the nodes and fibrils of the treated membranes. Over three hundred treated membranes were tested. Most of the pores in the treated membranes were not "blinded" or closed off. All the treated membranes displayed air permeabilities of more than 0.1 CFM/ft² and most were in the range of 0.2 and 1.3 CFM/ft². All the treated membranes displayed an MVTR of more than 69,000 gr/m²/day and most were in the range of 70,000 and 102,000 gr/m²/day. The treated membranes would hold out at least an 80% IPA challenge.

It is important to remember that comfort of the user of the composite membrane 12 is the prime test criteria and is difficult to quantify. However, it has been found that due to the increased air permeability of the composite membrane 12 according to the present invention user comfort is greater than previously known for an oleophobic, moisture vapor transmissive, wind and liquid penetration resistant membrane.

From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A method of treating a membrane, said method comprising the steps of:
   providing a membrane with surfaces that define a plurality of pores extending through the membrane;
   providing a water-based dispersion of oleophobic fluoropolymer solids;
   stabilizing the dispersion with a stabilizing agent;
   diluting the dispersion with a water-miscible wetting agent;
   wetting surfaces which define the pores in the membrane with the diluted and stabilized dispersion;
   removing the wetting agent and the stabilizing agent from the membrane; and
   coalescing the oleophobic fluoropolymer solids of the dispersion on surfaces that define pores in the membrane.

2. The method of claim 1 wherein said step of providing a membrane comprises providing a membrane with an average pore size of 10 microns or less.

3. The method of claim 1 wherein said step of providing a membrane comprises providing a membrane made from expanded polytetrafluoroethylene.

4. The method of claim 1 wherein said diluting step comprises diluting the stabilized dispersion in a wetting agent so the diluted and stabilized dispersion has a surface tension and contact angle relative to the membrane such that the diluted and stabilized dispersion is capable of wetting surfaces defining the pores in the membrane.

5. The method of claim 1 wherein said step of stabilizing the dispersion comprises providing the stabilizing agent in a weight amount in the range of 0.5 to 5 times the weight of the wetting agent.

6. The method of claim 1 wherein said step of stabilizing the dispersion includes providing water as the stabilizing agent.

7. The method of claim 1 wherein said step of providing a dispersion of oleophobic fluoropolymer solids comprises providing a dispersion of acrylic based polymer with fluorocarbon side chains.

8. The method of claim 1 wherein said step of diluting the dispersion of oleophobic fluoropolymer solids with a wetting agent comprises providing the wetting agent in a weight amount in the range of 2 to 10 times the weight of the dispersion.

9. The method of claim 1 wherein said coalescing step comprises heating the oleophobic fluoropolymer solids to a temperature in the range of 200° C. to 240° C. for at least ten seconds to flow and coalesce the oleophobic fluoropolymer solids on surfaces defining the pores in the membrane without completely blocking the pores.

10. A method of treating a membrane, said method comprising the steps of:

provided a membrane with a node and fibril structure of which surfaces of the nodes and fibrils define a plurality of pores extending through the membrane;

providing a water-based dispersion of oleophobic fluoropolymer solids, the dispersion has surface tension and contact angle properties relative to the membrane such that the dispersion is incapable of wetting pores in the membrane;

stabilizing the dispersion with a stabilizing element;

diluting the dispersion with a water-miscible wetting agent to provide a diluted and stabilized dispersion that has surface tension and contact angle properties relative to the membrane such that the diluted and stabilized dispersion is capable of wetting pores in the membrane;

wetting surfaces of the nodes and fibrils of the membrane with the diluted and stabilized dispersion;

removing the wetting agent and the stabilizing agent from the membrane; and coalescing the oleophobic fluoropolymer solids onto surfaces of the nodes and fibrils without completely blocking pores in the membrane by heating the wetted membrane.

11. The method of claim 10 wherein said step of providing a membrane comprises providing a microporous membrane.

12. The method of claim 10 wherein said step of providing a membrane includes the step of providing a membrane made of expanded polytetrafluoroethylene.

13. The method of claim 10 wherein said step of stabilizing the dispersion comprises providing a weight amount of stabilizing agent in the range of 0.5 to 5 times the weight of the dispersion.

14. The method of claim 10 wherein said step of stabilizing the dispersion includes providing water as the stabilizing agent.

15. The method of claim 10 wherein said step of providing a dispersion of oleophobic fluoropolymer solids comprises providing a dispersion of acrylic based polymer with fluorocarbon side chains.

16. The method of claim 10 wherein said step of diluting the dispersion of oleophobic fluoropolymer solids with a wetting agent comprises providing the wetting agent in a weight amount in the range of 2 to 10 times the weight of the dispersion.

17. The method of claim 10 wherein said coalescing step comprises heating the oleophobic fluoropolymer solids to a temperature in the range of 200° C. to 240° C. for at least ten seconds to flow and coalesce the oleophobic fluoropolymer solids on surfaces defining the pores in the membrane without completely blocking the pores.

18. The method of claim 10 wherein the average particle size of the oleophobic fluoropolymer is greater than about 0.1 microns.

19. The method of claim 10 wherein the average particle size of the oleophobic fluoropolymer is about 0.15 microns.

* * * * *